(12) United States Patent
Uhlhorn et al.

(10) Patent No.: US 8,666,248 B2
(45) Date of Patent: Mar. 4, 2014

(54) METHOD FOR DATA FRAME REDUCTION IN A PHOTONIC-BASED DISTRIBUTED NETWORK SWITCH

(75) Inventors: Brian L. Uhlhorn, St. Paul, MN (US); Stephen M. Sohn, Shoreview, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 594 days.

(21) Appl. No.: 12/916,684

(22) Filed: Nov. 1, 2010

(65) Prior Publication Data

US 2012/0106961 A1     May 3, 2012

(51) Int. Cl.
H04B 10/207 (2011.01)
H04J 14/00 (2006.01)

(52) U.S. Cl.
USPC .................. 398/63; 398/48; 398/49; 398/50; 398/51; 398/58

(58) Field of Classification Search
None
See application file for complete search history.

(56) References Cited

U.S. PATENT DOCUMENTS

| | | | | |
|---|---|---|---|---|
| 5,500,857 A * | 3/1996 | Nakata | ............................ | 370/440 |
| 5,521,732 A * | 5/1996 | Nishio | ............................... | 398/51 |
| 6,411,410 B1 * | 6/2002 | Wright et al. | ..................... | 398/79 |
| 6,546,014 B1 * | 4/2003 | Kramer et al. | ............. | 370/395.41 |
| 2002/0154354 A1 * | 10/2002 | Raj et al. | ......................... | 359/124 |
| 2002/0196491 A1 * | 12/2002 | Deng et al. | ..................... | 359/124 |
| 2003/0180049 A1 * | 9/2003 | Park | ................................ | 398/72 |
| 2005/0141892 A1 | 6/2005 | Park et al. | | |
| 2008/0019691 A1 * | 1/2008 | Guignard et al. | ............... | 398/48 |
| 2009/0010650 A1 | 1/2009 | Tsuchiya et al. | | |
| 2009/0022493 A1 * | 1/2009 | Lu | .................................... | 398/58 |
| 2009/0208204 A1 * | 8/2009 | Zhang et al. | ..................... | 398/25 |
| 2010/0183298 A1 | 7/2010 | Biegert et al. | | |
| 2010/0239257 A1 * | 9/2010 | Grossman et al. | .............. | 398/68 |
| 2011/0033187 A1 * | 2/2011 | Rossetti et al. | .................. | 398/79 |

OTHER PUBLICATIONS

Jue et al: "Multiconfiguration Multihop Protocols: A New Class of Protocols for Packet-Switched WDM Optical Networks", IEEE/ACM Transactions on Networking, Vol. 8, No. 5, May 2000, p. 631-641.*
Jue et al: "Performance Analysis of the Rainbow WDM Optical Network Prototype", IEEE Journal on Selected Areas in Communications, vol. 14, No. 5, Jun. 1996, pp. 945-951.*
U.S. Appl. No. 12/916679, filed Nov. 1, 2010 (17 pages).
U.S. Appl. No. 12/915,491, filed Oct. 29, 2010 (15 pages).
International Search Report for international application No. PCT/US2011/057991, dated Feb. 2, 2012 (3 pages).
Written Opinion of the International Searching Authority for international application No. PCT/US2011/057991, dated Feb. 2, 2012 (4 pages).

\* cited by examiner

*Primary Examiner* — Li Liu
(74) *Attorney, Agent, or Firm* — Hamre, Schumann, Mueller & Larson, P.C.

(57) ABSTRACT

A photonic-based distributed network switch and method where the switch is designed to reduce or filter optical data frames entering a port of the switch so that only data frames that are appropriate for the port are forwarded from the port. This reduces the amount of data that needs to be handled by the port interface, which is especially important where the port may be using legacy interface technology that may be incapable of handling the volume of data entering the port.

12 Claims, 5 Drawing Sheets

US 8,666,248 B2

METHOD FOR DATA FRAME REDUCTION IN A PHOTONIC-BASED DISTRIBUTED NETWORK SWITCH

FIELD

This disclosure relates to a photonic-based distributed network switch useable in a broadcast-based photonic network.

BACKGROUND

Commercial-off-the-shelf switches in conventional networks perform receive channel data processing using a centralized algorithm method based on an application specific integrated circuit (ASIC), field programmable gate array (FPGA), and/or using software.

SUMMARY

A photonic-based distributed network switch and method are described for processing of received multiplexed data-frame streams in a photonic-based distributed switch environment at photonic data rates. The switch is designed to reduce or filter optical data frames entering a port of the switch so that only data frames that are appropriate for the port are forwarded from the port. This reduces the amount of data that needs to be handled by the port interface, which is especially important where the port may be using legacy interface technology that may be incapable of handling the volume of data entering the port.

In one embodiment, the photonic-based distributed network switch includes a passive optical star, and a plurality of independent ports connected to the optical star. Each port includes a data frame reduction stage that is configured to reduce optical data frames that enter the respective port. For each port, optical data frames that enter the respective port are directed to the data frame reduction stage for reducing the data frames. The optical data frames will typically come from the optical star which routes data frames entering each port to all of the other ports. However, the data frames to be reduced can come from an host external device that is connected to the port. In certain circumstances, depending upon the configuration of the data frame reduction stage, the data frames may not actually be reduced if the data frame reduction parameters of the data frame reduction stage are not met.

In another embodiment, a photonic-based distributed network switch is provided that includes a passive optical star and a plurality of independent ports connected to the optical star. For each port, a plurality of optical data frames are directed from the passive optical star into the port. The plurality of data frames are directed to a data frame reduction stage in the port, and data frames that exit the data frame reduction stage are directed to an external device that is connected to the port.

The reduction technique can occur on any flow of data in optical form going to and through the ports. In one example, the data flow takes the form of discrete data packets, each data packet being constructed by combining one or more data frames. Therefore, a data packet constructed from a single data frame could also be considered or referred to as a data frame. As used herein, unless otherwise specified or defined, the terms data packet and data frame are intended to refer generally to any discrete flow of data. The data flow could also be streamed.

DRAWINGS

DETAILED DESCRIPTION

Figure 1:
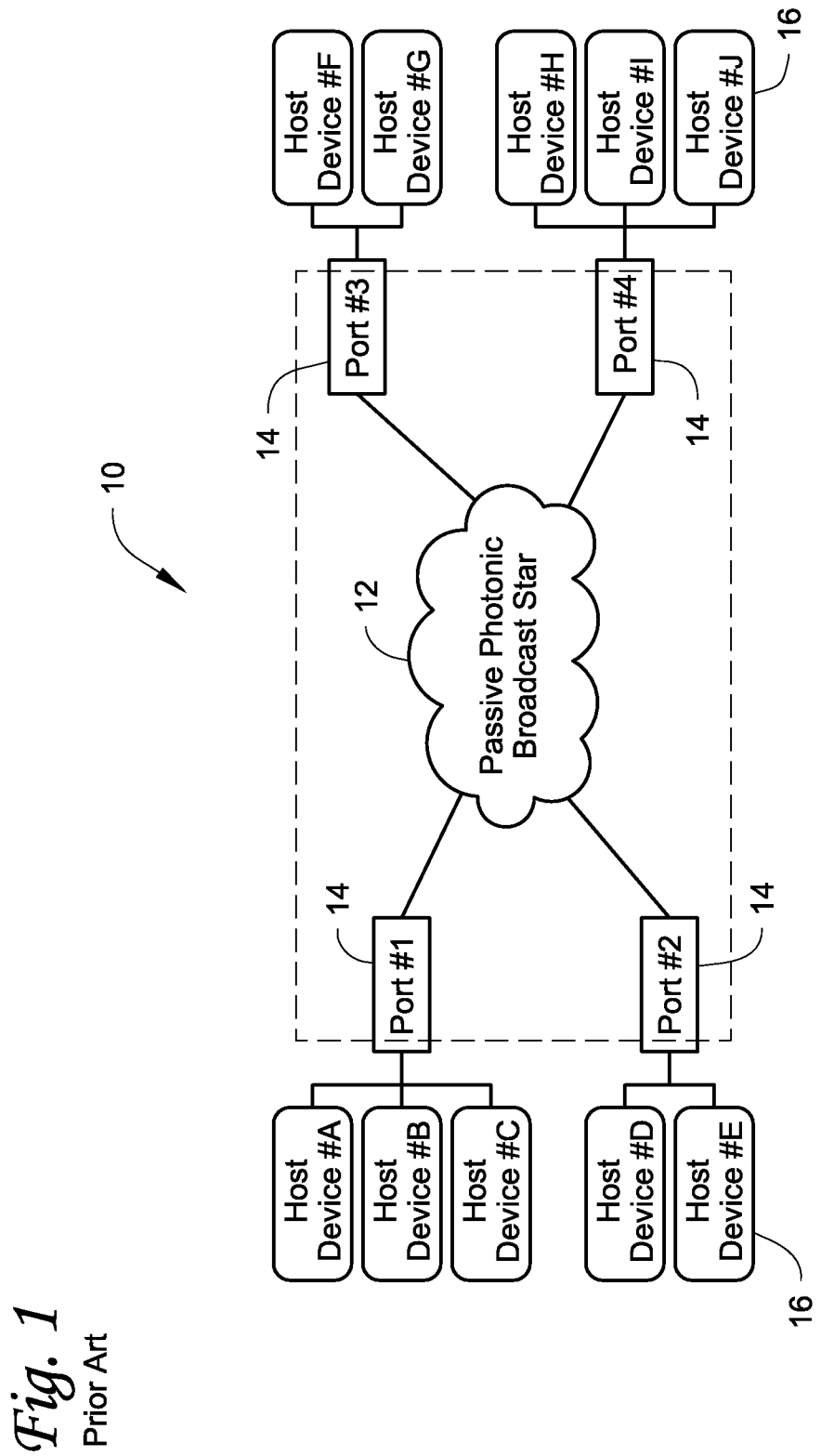
FIG. 1 illustrates a known photonic-based distributed network switch that can employ the methods described herein.

FIG. 1 illustrates a known photonic-based distributed network switch 10. The switch 10 includes a passive photonic or optical broadcast star 12. A plurality of independent ports 14 are connected to and in communication with the passive broadcast star 12 to route data frames to and receive data frames from the star 12. The data frames to and from the star 12 are optical data frames suitable for use in a photonic-based system that are multiplexed in a data frame stream. FIG. 1 shows four ports 14 although a larger or smaller number of ports can be utilized. The ports 14 permit connection of the switch 10 to host external network-enabled devices 16. The external devices 16 can be any network-enabled devices including, but not limited to, computers, network routers, network switches, storage units, printers, sensor systems, plotters, and wireless access points.

The terms data packet and data frame are used herein interchangeably and are intended to refer generally to any discrete flow of data. A data packet can be constructed from a plurality of data frames, or from a single data frame in which case the data packet can also be referred to as a data frame.

Data signals to and from the external devices 16 are in the form of digital signals, while the data signals in the switch 10 are in the form of analog optical signals. The conversion to/from digital signals from/to optical signals can occur in the ports 14 using suitable conversion techniques. The conversion of digital signals to/from optical signals is well known to those of ordinary skill in the art.

Figure 2:
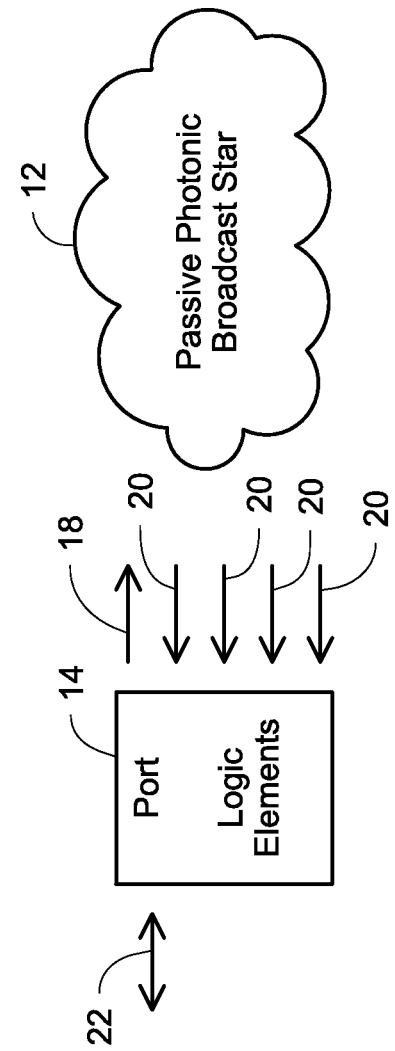
FIG. 2 illustrates the operational concept of each of the ports and the passive optical broadcast star of the photonic-based distributed network switch of FIG. 1.

With reference to FIGS. 1 and 2, the passive optical broadcast star 12 can be, for example, a passive device that contains only passive optical components and no electronics. The broadcast star 12 replicates all data frames received from a respective port 14 on a one-way incoming channel 18 from a respective port 14 onto multiple one-way outgoing channels 20. In the illustrated example, there is one channel 18 going to the star 12 from each port 14, and P channels from the star 12 to each port, with P being the total number of ports. A similar construction to that shown in FIG. 2 is used for each port. The broadcast star 12 allows each port 14 to see all data frames for all ports 14. Therefore, any data frame that comes into, for example, port 1 is automatically received by the ports 2, 3 and 4 via the star 12. In addition, each port receives its own information back from the star 12.

The ports 14 include the interfaces and logic that actively process and forward data frames in and from the switch 10 and connect the switch to the external devices 16. A two-way external channel 22 connects each port 14 to the external devices. The ports 14 operate independent of one another, with each port including the switching and protocol processing logic needed to perform network address resolution and data frame processing and forwarding.

The external devices 16 can be connected to the ports 14 via conventional interface and protocol technology, including wireless and wired technologies. Examples of wired connection technologies include for example, but not limited to, Ethernet, RS-232, RS-422, and USB. Examples of wireless connection technologies include for example, but not limited to, radio frequency, infrared light, laser light, visible light, and other technologies that can transfer data frames without the use of wires.

Any number of external devices can be connected to each port. In FIG. 1, three external devices (for example computers A, B, C) are shown connected to port 1, two external devices (for example computers D and E) are connected to port 2, two external devices (for example computers F and G) are connected to port 3, and three external devices (for example computers H, I and J) are connected to port 4.

The general construction of the switch illustrated in FIGS. 1 and 2 is known. However, because each port receives all data frames from other ports (and receives its own data frames) via the optical star 12, each port may receive data frames that are not required by the port or do not need to be forwarded by the port to any external devices connected to that port. Therefore, each port 14 differs from conventional ports in that each port is provided with means to reduce or filter data frames entering the port by dropping certain data frames based on desired selection criteria, so that only data frames that are appropriate for the port are forwarded from the port. Although the description and drawings refer to reduction of data frames coming from the optical star, it is contemplated that reduction or filtering of data frames may also occur on data frames that enter each port from the external devices before the data frames are forwarded from the ports to the optical star for distribution to the other ports.

The reduction means in each port includes one or more data frame reduction stages 30 (FIG. 4) in each port that include decision logic that determines which data frames to drop and action logic that determine what to do with remaining data frames (i.e. data frames that are not dropped).

Figure 3:
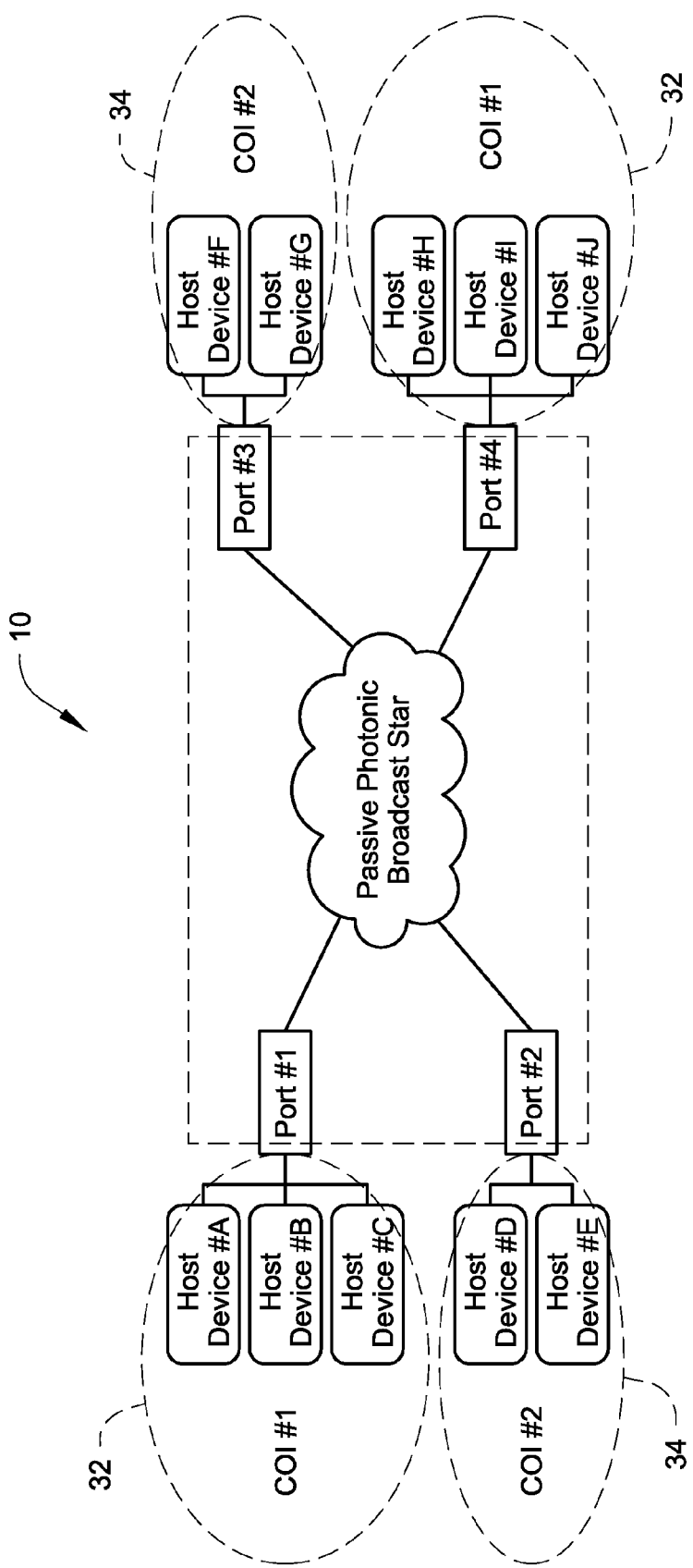
FIG. 3 illustrates the concept of community of interest as applied to the photonic-based distributed network switch.

Any criteria for determining which data frames to drop and which data frames to let through, and what to do with the remaining data frames, can be used. The selection criteria can be static or dynamically changing. FIG. 3 illustrates one example of suitable selection criteria. In this example, the external devices are segregated into communities of interest (COI) 32, 34. A COI is a segregation of network assets, in this case the external devices 16, into discrete groups for some established purpose.

An example of a reason for creating the COI's 32, 34 includes, but is not limited to, separating the external devices into different security classification levels. In this example, COI 32 and any data frames coming therefrom could have a security level of "classified" while COI 34 and any data frames coming therefrom have a security level of "unclassified". The COI's 32, 34 need to be kept separated so that data frames from COI 32 are not provided to COI 34, thereby preventing COI 34 from accessing classified data. For purposes of this example, it is assumed that one also wants to prevent data frames from COI 34 from being provided to COI 32, even though data frames from COI 34 are unclassified.

In the photonic-based distributed network switch 10, segregation of the COI's 32, 34 is enforced by the ports 14. The data frame reduction means in each port is designed to determine whether a data frame coming into the port from the optical star 12 is suitable for transmission to one or more of the external devices 16 connected to that port. In one exemplary implementation, using the data frame reduction means in each port, the ports 14 prevent data frames from the COI's 32 from being transmitted to the COI's 34, and likewise prevent data frames from the COI's 34 from being transmitted to the COI's 32.

Figure 4:
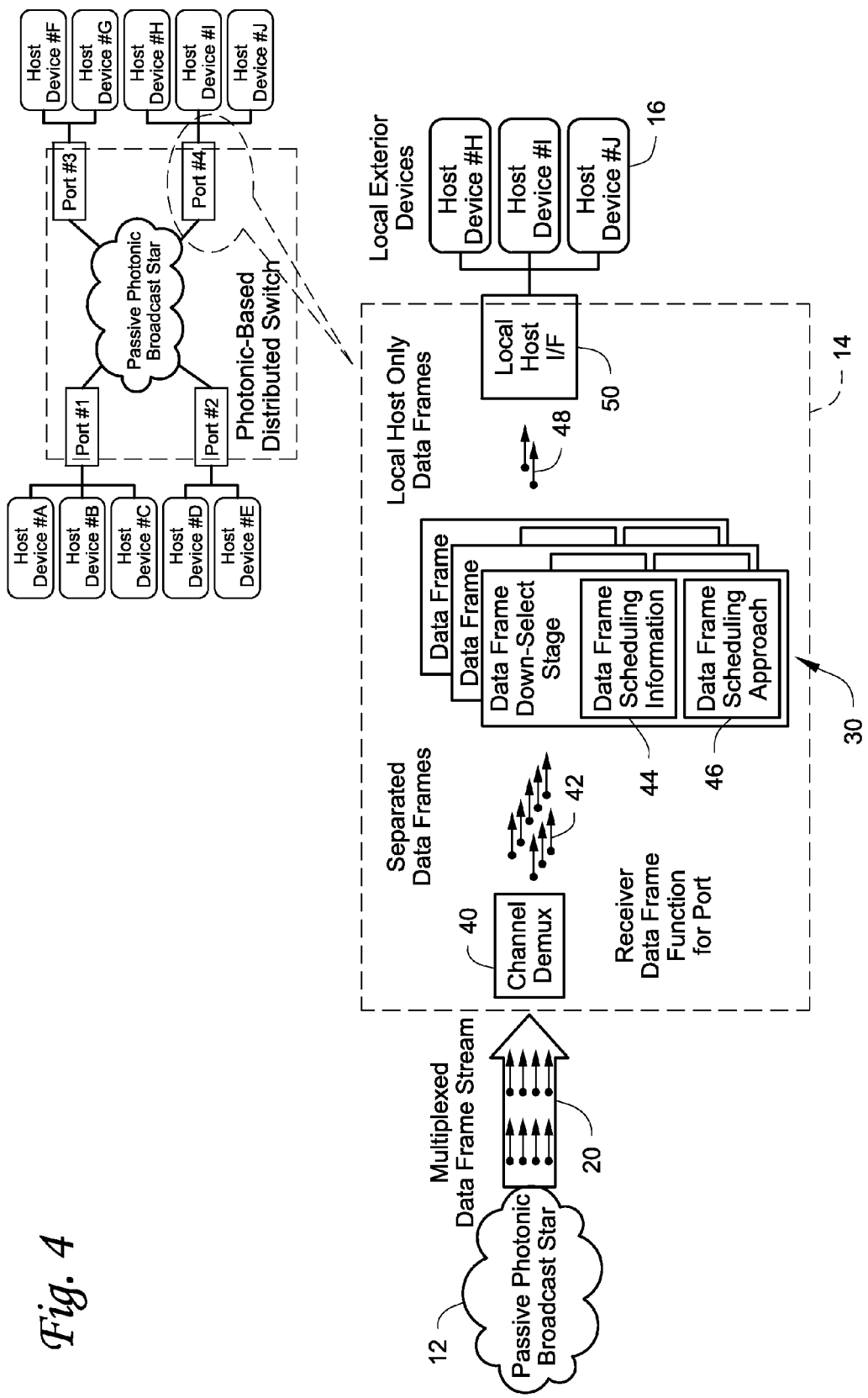
FIG. 4 illustrates the concept of data frame reduction in the photonic-based distributed network switch.

FIG. 4 illustrates the data frame reduction concept with respect to port 4 of the switch 10. The other ports of the switch operate in a similar manner in that they are designed to reduce data frames. However, it is to be understood that the selection criteria used to determine reduction need not be the same in each port.

As shown in FIG. 4, each port 14 includes a plurality of channel demultiplexers 40 that are connected to the optical star 12 via a respective one of the channels 20. Each channel 20 includes one of the demultiplexers 40. Each channel 20 carries a multiplexed optical data frame stream from the star 12 to the respective demultiplexer 40. Each demultiplexer 40 separates the multiplexed data frames into individual data frames 42. The data frames 42 are then provided to the data frame reduction stage(s) 30. In the illustrated example, each reduction stage 30 includes data frame scheduling information 44 and a data frame scheduling approach 46 that process the data frames.

The data frame scheduling information 44 can be thought of as a decision stage which defines the rules for how a data frame will be processed and includes decision logic that determines which data frames to drop. The scheduling information 44 can include any rules or selection criteria for allowing a decision to be made about whether or not a data frame 42 should be dropped. Examples of selection criteria include, but are not limited to, information relating to distribution or addressing of data frames from the respective port, such as COI membership, and/or media access control (MAC) addresses or internet protocol (IP) addresses of external devices connected to the port.

The data frame scheduling approach 46 can be thought of as an action stage with action logic which defines how data frames that are not dropped will be forwarded to the external devices connected to the port. The scheduling approach 46 can include any criteria for defining how data frames will be forwarded. Examples of criteria include, but are not limited to: priority based forwarding; round-robin based forwarding (for example, channel 1 is processed first, channel 2 processed next, channel 3 next, etc.); queue based forwarding (i.e. first-come-first-served; for example, the first data frame to arrive gets processed first); and quality of service criteria such as assigning priorities to data based on applications, users, or data flows, or to provide a certain level of performance to a data flow, for example a predetermined bit rate, delay, jitter, packet dropping probability and/or bit error rate.

Figure 5:
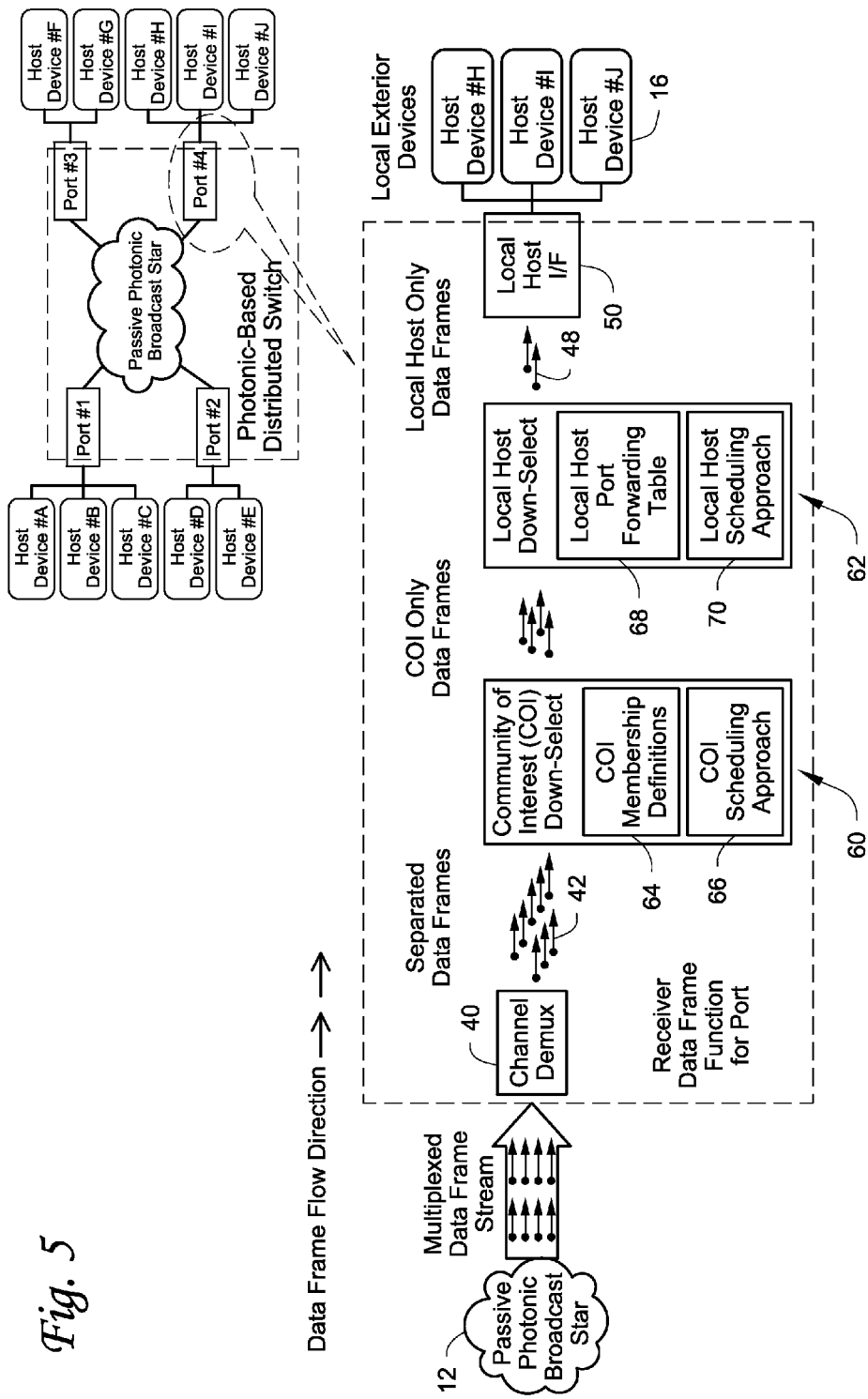
FIG. 5 illustrates an example of data frame reduction using exemplary reduction criteria.

If desired, the data frames can be passed to multiple reduction stages 30. FIG. 4 illustrates three (3) reduction stages 30 although a larger or smaller number of stages 30 can be used. The stages 30 can operate in series or sequentially, in parallel, or a combination of series and parallel. For example, in a series arrangement, all data frames can pass into a first reduction stage, and any data frames passing through the first reduction stage then pass into a second reduction stage, as shown in FIG. 5. Alternatively, all of the data frames 42 can be passed into a first reduction stage as well as passed into a second reduction stage operating in parallel to one another. There could be a reduction stage followed in series by two reduction stages operating in parallel, or two reduction stages operating in parallel followed in series by a one or more additional reduction stages. Any combination of reduction stages can be employed depending in part upon the amount and type of data frame reduction that is desired and the selection criteria being used.

In addition, all data frames do not need to pass through each reduction stage. For example, some data frames passing through a first reduction stage could bypass a second reduction stage while other data frames passing through the first stage are passed into the second stage.

Data frames 48 that make it through the data frame reduction stage(s) 30 flow to a port interface 50 and to the appropriate external device 16 over the channel 22. The interface 50 can be conventional interface technology, for example, Ethernet. The interface 50 can send out the data frames immediately if its transmission rate is high enough, or it can buffer data frames before transmitting the data frames.

To help better explain the concept of data frame reduction by the ports 14, a specific example will be described with respect to the port 4 shown in FIG. 5. It is to be realized that the data frame reduction concept is not limited to the specific example described in FIG. 5 and can be implemented in other manners. In addition, the other ports can have a similar construction to that shown in FIG. 5.

In FIG. 5, two serial or sequential reduction stages are provided. One reduction stage 60 is a COI reduction stage that determines if the incoming data frame 42 is in a community of interest that the external device 16 connected to the interface 50 is a member of. If it is, the data frame 42 is passed through to a second reduction stage 62. If not, the data frame 42 is dropped and does not pass through the reduction stage 60. The reduction stage 62 is a local device stage that determines if the incoming data frame is for an external device 16 that is interfaced to the port. If so, the data frame is forwarded to the external device. If not, the data frame is dropped and does not pass through the stage 62.

The COI reduction stage 60 includes COI membership definitions 64 which define COI members that may be connected to the switch 10 and that form the selection criteria for determining whether or not an incoming data frame is in a community of interest that the local external device 16 is a member of. The COI reduction stage 60 also includes a COI scheduling approach 66 that defines how data frames belonging to the COI of interest will be forwarded to the COI.

The local device stage 62 includes a local device port forwarding table 68 or other information related to the distribution or addressing of data frames from the port to the external devices 16. The forwarding table can include any information that is used for distributing or addressing the data frames from the port to the external devices. Examples of information in the port forwarding table can include, but are not limited to, media access control (MAC) addresses or internet protocol (IP) addresses of the external devices, and local port identifiers. Further information on a port forwarding table in a photonic-based distributed network switch is disclosed in U.S. patent application Ser. No. 12/916,679, filed on Nov. 1, 2010, titled METHOD FOR UPDATING PORTS IN A PHOTONIC-BASED DISTRIBUTED NETWORK SWITCH (attorney docket 20057.0135US01).

The local device stage 62 also includes a local device scheduling approach 70 that defines how data frames will be forwarded to the external devices connected to the port. For example, the scheduling approach 60 can define how the data frames are transmitted to each external device based on criteria including, but not limited to, for example how busy an external device is, whether an external device has priority over other external devices in the COI, the data transfer rate preferred by each external device, the current operational state of the external device, etc.

As indicated above, while the data frames have been described and illustrated as coming from the optical star for transmission to the external devices, it is contemplated that the data frame reduction concepts described herein can be applied to data frames entering the ports from the external devices prior to being forwarded from the ports to the optical star.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method comprising:
in a photonic-based distributed network switch that includes a passive photonic broadcast star and a plurality of independent ports each of which is connected to the broadcast star via a plurality of channels, the number of channels connected to each port is equal in number to the number of ports, for each channel of each port: directing a multiplexed optical data frame stream containing a plurality of data frames into a demultiplexer that is connected to the respective channel in the respective port, the number of demultiplexers equals the number of ports, demultiplexing the optical data frame stream into the plurality of data frames, and thereafter directing the plurality of data frames into a data frame reduction stage in the respective port for reducing the data frames.

2. The method of claim 1, wherein the data frame reduction stage determines which data frames to drop and what to do with remaining data frames.

3. A method according to claim 1,
comprising directing the data frames from the demultiplexers in each port to a plurality of data frame reduction stages in the respective port downstream of the demultiplexers.

4. The method of claim 3, wherein the plurality of data frame reduction stages operate in series, in parallel or a combination of series and parallel.

5. A method comprising:
providing a photonic-based distributed network switch that includes a passive optical star and a plurality of independent ports each of which is connected to the optical star via a plurality of channels, the number of channels connected to each port is equal in number to the number of ports; and
for each channel of each port:
directing a multiplexed optical data frame stream containing a plurality of data frames from the passive optical star into the port;
using a plurality of demultiplexers in the port equal in number to the number of ports to demultiplex the multiplexed optical data frame stream into the plurality of data frames, each demultiplexer is connected to a respective one of the channels;
thereafter directing the plurality of data frames into a data frame reduction stage in the port; and
directing data frames that exit the data frame reduction stage to an external. device that is connected to the port.

6. The method of claim 5, wherein the data frame reduction stage of each port determines which data frames to drop and what to do with remaining data frames.

7. The method of claim 5, comprising: for each port directing the plurality of data frames to a plurality of data frame reduction stages in each port downstream of the demultiplexers.

8. The method of claim 7, wherein the plurality of data frame reduction stages in each port operate in series, in parallel or a combination of series and parallel.

9. A photonic-based distributed network switch, comprising:

a passive optical star, and a plurality of independent ports connected to the optical star, each port includes a plurality of demultiplexers connected to the optical star to receive optical data frames and a data frame reduction stage connected to the demultiplexers downstream of the demultiplexers that is configured to reduce optical data frames that are received from the demultiplexers; and the number of demultiplexers in each port equals the number of ports.

10. The photonic-based distributed network switch of claim 9, further comprising a host interface connected to the data frame reduction stage.

11. The photonic-based distributed network switch of claim 9, wherein the data frame reduction stage includes decision logic that determines which data frames to drop and action logic that determine what to do with remaining data frames.

12. The photonic-based distributed network switch of claim 11, comprising a plurality of the data frame reduction stages downstream of the demultiplexer, the plurality of data frame reduction stages are arranged to operate in series, in parallel or a combination of series and parallel.

* * * * *